(12) United States Patent
Lee et al.

(10) Patent No.: US 7,641,035 B2
(45) Date of Patent: Jan. 5, 2010

(54) ROLLER STAND

(75) Inventors: Robin C. Lee, Ottawa (CA); Steven K. Jones, Ottawa (CA); Scott T. Roger, Ottawa (CA)

(73) Assignee: Lee Valley Tools, Ltd., Ottawa, ON (CA)

( * ) Notice: Subject to any disclaimer, the term of this patent is extended or adjusted under 35 U.S.C. 154(b) by 580 days.

(21) Appl. No.: 10/963,866

(22) Filed: Oct. 12, 2004

(65) Prior Publication Data

US 2005/0077141 A1   Apr. 14, 2005

Related U.S. Application Data

(60) Provisional application No. 60/510,682, filed on Oct. 9, 2003, provisional application No. 60/603,960, filed on Aug. 23, 2004.

(51) Int. Cl.
*B23Q 3/10* (2006.01)
*B23Q 3/02* (2006.01)
*B65G 47/52* (2006.01)

(52) U.S. Cl. .......... 193/37; 193/35 R; 198/501; 198/861.1; 198/632; 198/581; 198/313; 108/147.2; 108/116; 108/147.19; 248/166

(58) Field of Classification Search .......... 193/35 SS, 193/37, 35; 198/501, 824, 842, 861.1, 474, 198/492; 248/413, 419, 424
See application file for complete search history.

(56) References Cited

U.S. PATENT DOCUMENTS 2,733,330 A * 1/1956 Bietwett .................. 219/158
3,006,594 A * 10/1961 Gruendler ................ 248/424
5,064,156 A    11/1991 Handler et al.
5,247,976 A *  9/1993 Matthews ................ 144/287
6,095,319 A *  8/2000 Noniewicz et al. ...... 198/632
6,179,024 B1 * 1/2001 Yang ....................... 144/287
6,179,116 B1 * 1/2001 Noniewicz et al. ...... 198/632
6,183,188 B1 * 2/2001 Randazzo et al. ...... 414/744.5
6,315,138 B1 * 11/2001 Dyson ..................... 212/336
2004/0256525 A1 * 12/2004 Noniewicz ............... 248/164

FOREIGN PATENT DOCUMENTS

FR    2575403 A1    7/1986
JP    11-285990     10/1999
JP    11285990 A *  10/1999

OTHER PUBLICATIONS

International Preliminary Report on Patentability mailed Mar. 8, 2007 for PCT/IB2005/002435.

* cited by examiner

*Primary Examiner*—Gene Crawford
*Assistant Examiner*—Kavel P Singh
(74) *Attorney, Agent, or Firm*—Kilpatrick Stockton LLP; John S. Pratt; Camilla C. Williams

(57) ABSTRACT

An out-feed roller support stand having a sturdy, stable base that folds for compact storage. A support mast that telescopes into and is adjustable within the base supports a work support head that includes an adjustable cross bar on which a row of pivoting caster wheels are mounted. An alternative embodiment includes a ramp for guiding sagging ends of workpieces up onto the caster wheels. Both the height and angle between the adjustable cross bar and floor are adjustable after the position of the support mast has been adjusted in order to position the support head in roughly the correct location.

15 Claims, 7 Drawing Sheets

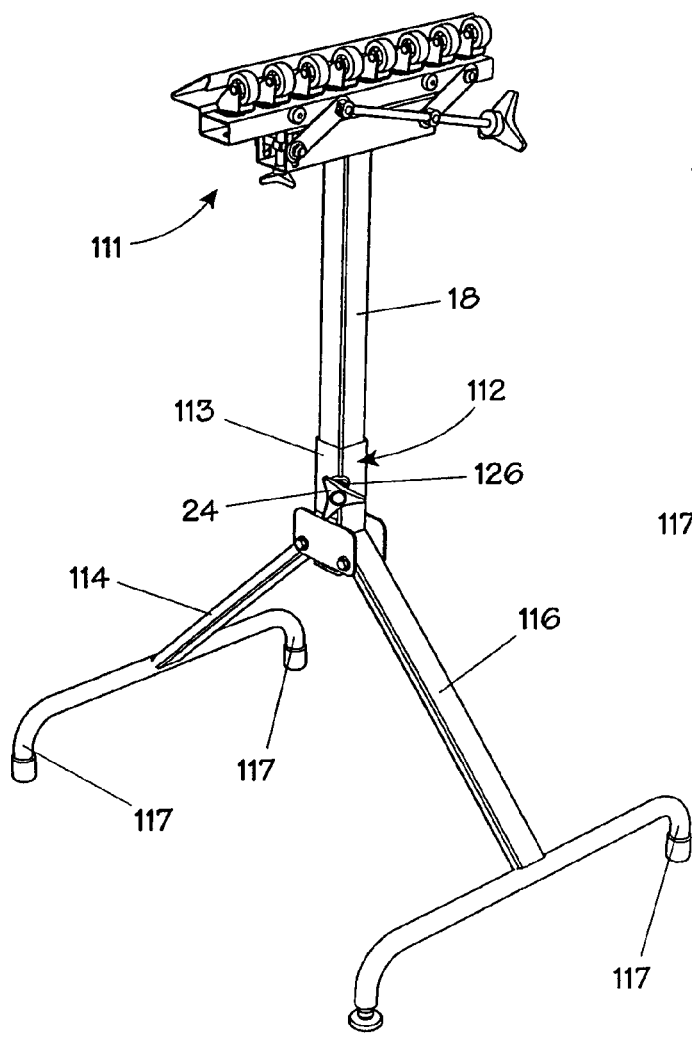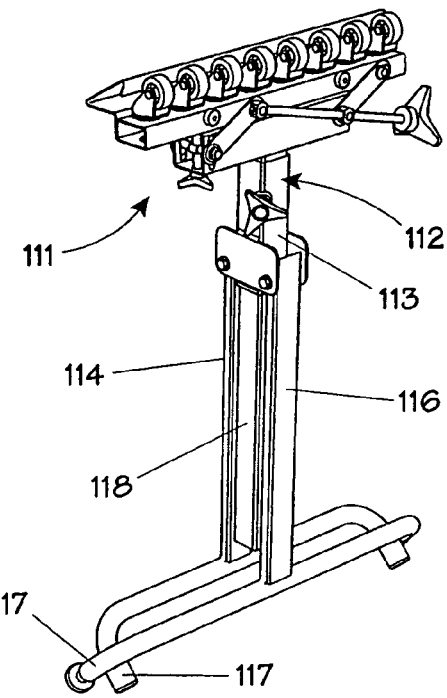
FIG. 10
FIG. 11

ROLLER STAND

CROSS-REFERENCE TO RELATED APPLICATIONS

This application claims priority to U.S. Provisional Application Ser. No. 60/510,682 filed Oct. 9, 2003 entitled "Roller Stand" and U.S. Provisional Application Ser. No. 60/603,960 filed Aug. 23, 2004 entitled "Roller Stand", both of which are incorporated herein by reference.

FIELD OF THE INVENTION

This invention relates to in-feed and out-feed roller supports and other conveyers for receiving and supporting material being processed, such as solid lumber or plywood being cut on a table saw.

BACKGROUND OF THE INVENTION

When working with lumber or plywood or other man-made sheet materials, there is frequently a need to provide auxiliary support for those materials, particularly when using fixed tools such as table saws, router tables, thickness planers, and jointers. In these situations it is necessary to have the work-piece supported at both ends, both to insure an accurate cut and for safety reasons. Typically, the user is feeding the material into the tool, so the in-feed side of the material is supported by the tool user. Some sort of support is often required for the out-feed side of the machine. Furthermore auxiliary in-feed support is also sometimes needed, such as when extremely long stock is being machined.

This support needs to meet several requirements.
1. It must be strong enough to support the weight of the material.
2. It must be stable enough that the moving material cannot move it or tip it over, particularly when the material first contacts the support.
3. It must be adjustable so that the work-piece-contacting portions of the support can be made level and in line with the work-piece supporting structure of the machine.
4. It must offer low resistance to the moving material. This reduces the effort required by the operator and reduces the opportunity the material has for tipping the support over.
5. It must not impart any directional forces on the work-piece. Re-directing a work-piece while it is being machined can result, at best, in an inaccurate cut; at worst it can result in the tool binding and, work-piece kick-back with resulting damage to tool and injury to user.

Additional features are also desirable. For instance:
6. It is desirable for the support to be easily positioned and adjusted.
7. It is desirable for the support to be easy to store in a relatively small space.
8. It is desirable for the support to be configured so that the advancing end of a work-piece will successfully engage and be supported by the support even of the end of the work-piece is sagging when it encounters the support.

Numerous user-made and commercially manufactured supports are available. None include all of the features identified above.

For instance, a typical problem with existing out-feed supports is that it is difficult or impossible to get the support "head" exactly in line and level with the tool. This can be difficult for a number of reasons, including a shop floor for other support surface that is not level or a tool that is not set up perfectly level. Many existing out-feed supports provide for both height and angular adjustment of the head by providing a tube supporting the head that telescopes within a tube projecting from a base, or that is part of a base, and a thumb screw or male wing knob threaded through the base tube bears against the head support tube to lock it in position. The weight of the head tends to cause the head support tube to fall down into the base tube as soon as the thumb screw is loosened, and correct adjustment is very difficult because the weight of the head has to be supported with one hand while its height and angle are adjusted very accurately and the thumb screw is tightened. This needs to be accomplished without affecting head height or angular position, but the act of tightening the thumb screw often moves the position of the head as the screw acts on the support tube. Often this head positioning operation needs to be done while a work-piece is also being supported by the head and the machine with which the out-feed roller support is being used in order to establish the height at which the head needs to be positioned.

Out-feed stands or supports must have some sort of head that allows the work-piece to slide over it with very minimal resistance. There are two reasons for this. First, if there is high resistance to the material movement, the stand may simply be knocked over. Secondly, high resistance increases the force a user must apply to move the work-piece. This is undesirable from the point of view of fatigue, but, more importantly, it is also a safety issue. A slip while a user is applying force toward the tool blade or cutter can lead to operator contact with the blade and serious injuries. Typical existing roller stands generally incorporate either a single long roller, or a series of ball rollers for contact with the work-piece being supported. Each approach is less than ideal. A single long roller sufficiently distributes the load of the work-piece to prevent damage; however, unless this roller is carefully aligned with the machine, so that the roller axis of rotation is parallel to the machine work surface and perpendicular to the direction of travel of the work-piece, the roller will tend to guide the work-piece out of line rather than along its intended direction of travel. Multiple ball rollers do not need to be precisely aligned due to their multidirectional nature, however the point contact with the work-piece can lead to damage of the work-piece surface because the entire weight of the work-piece being supported by the support stand bears on the very small areas of contact with the balls.

A support stand head needs to be level with the work surface of the machine with which it is being used. This is perhaps more critical than getting the stand at the same height, since the work-piece will be guided out of line if the out-feed head is not level with the tool.

Some out-feed stands address this issue by supplying adjustable feet to the stand. Alternatively, the angle of the head may be adjusted in prior art stands having masts that tilt relative to the floor by rotating the mast on which the head rests. Adjustment in this manner is very difficult because, among other reasons, it is difficult simultaneously to adjust the angle of the head and the projection of the mast from such prior art stands.

The height and angle adjustment mechanisms of prior art stands often require substantial "trial and error" to correctly adjust the stand, and the time required to get it right often encourage use with less than optimal positioning.

For the reasons described above, among others, none of the prior art support stands address all of the needs of such a stand.

SUMMARY OF THE INVENTION

The work piece support of this invention provides an easily adjusted support head that may be itself supported by a sturdy, stable base that folds for compact storage. A support mast telescopes into and is adjustable within the base but cannot rotate relative to the base. The mast supports a work support head that includes a fixed cross bar rigidly attached to the mast. The fixed cross bar supports an adjustable cross bar on which a row of pivoting caster wheels are mounted. Both the distance and angle between the fixed and adjustable cross bars are adjustable after the position of the support mast has been adjusted in order to position the support head in roughly the correct location. Provision of mechanisms for separately adjusting the height of the support head by substantial amounts and by small amounts, and relatively independent provisions for adjusting the support head height and angle by small amounts are significant aspects of this invention. Also significant to the success of this invention are the provision of angle and fine height adjustment mechanisms that fully support the head and any work-piece that may be resting on the head during adjustment, the absence of which is a significant failing of many of the prior art support stands. In some embodiments, a ramp or other structure is provided to guide the sagging end of a work-piece upward so that it will roll over the caster wheels as desired rather than pushing the support stand over or out of position. The stand is optional; the support head may rest directly on a relatively horizontal support surface such as a floor or a bench.

BRIEF DESCRIPTION OF THE DRAWINGS

FIGS. 10 and 11 are perspective view of a second embodiment of the support of this invention, shown positioned for use and folded for storage, respectively.

DETAILED DESCRIPTION OF THE DRAWINGS

Figure 1:
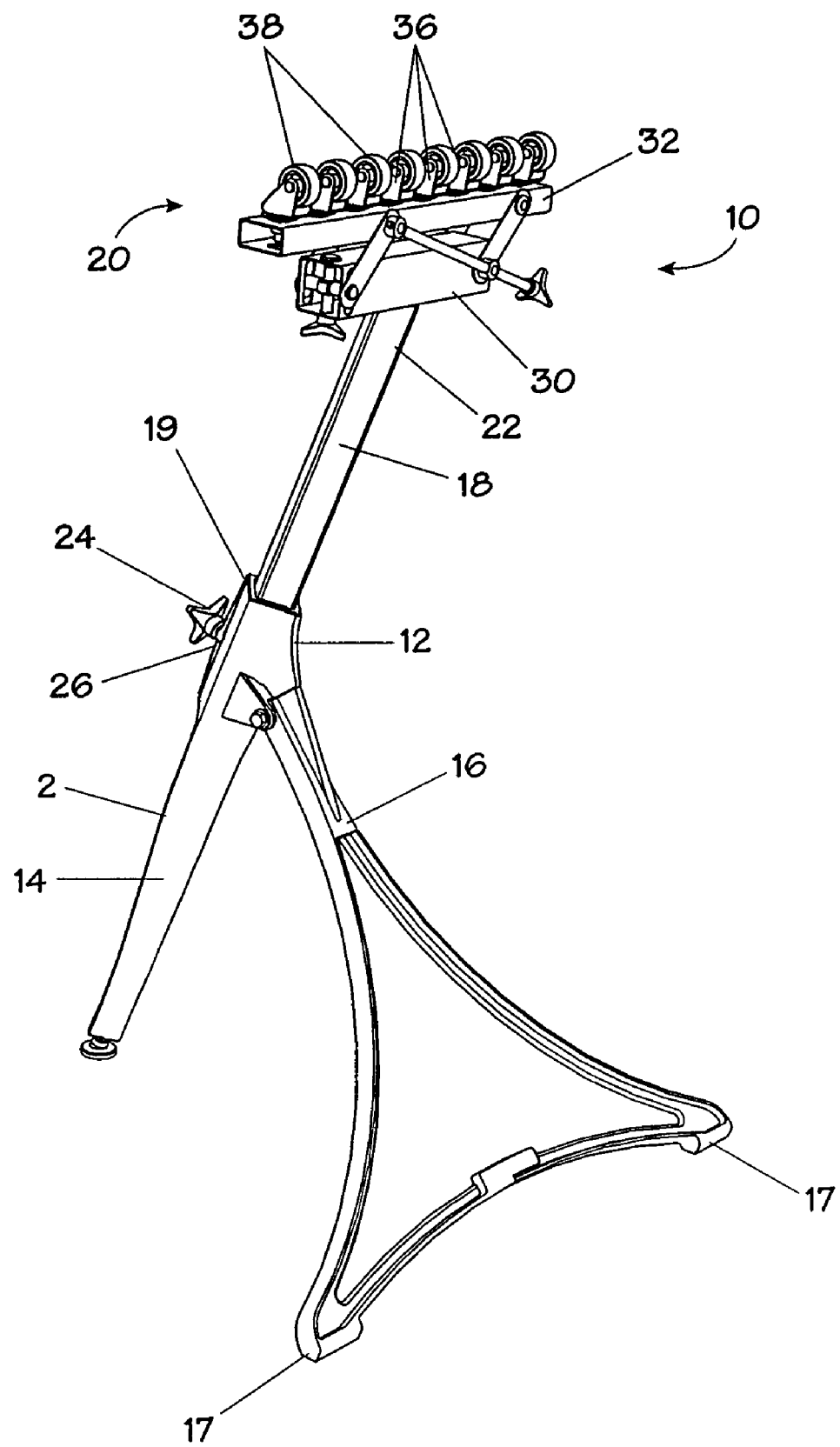
FIG. 1 is a perspective view of one embodiment of the support of this invention showing the side typically positioned away from the machine with which it is being used.
Figure 2:
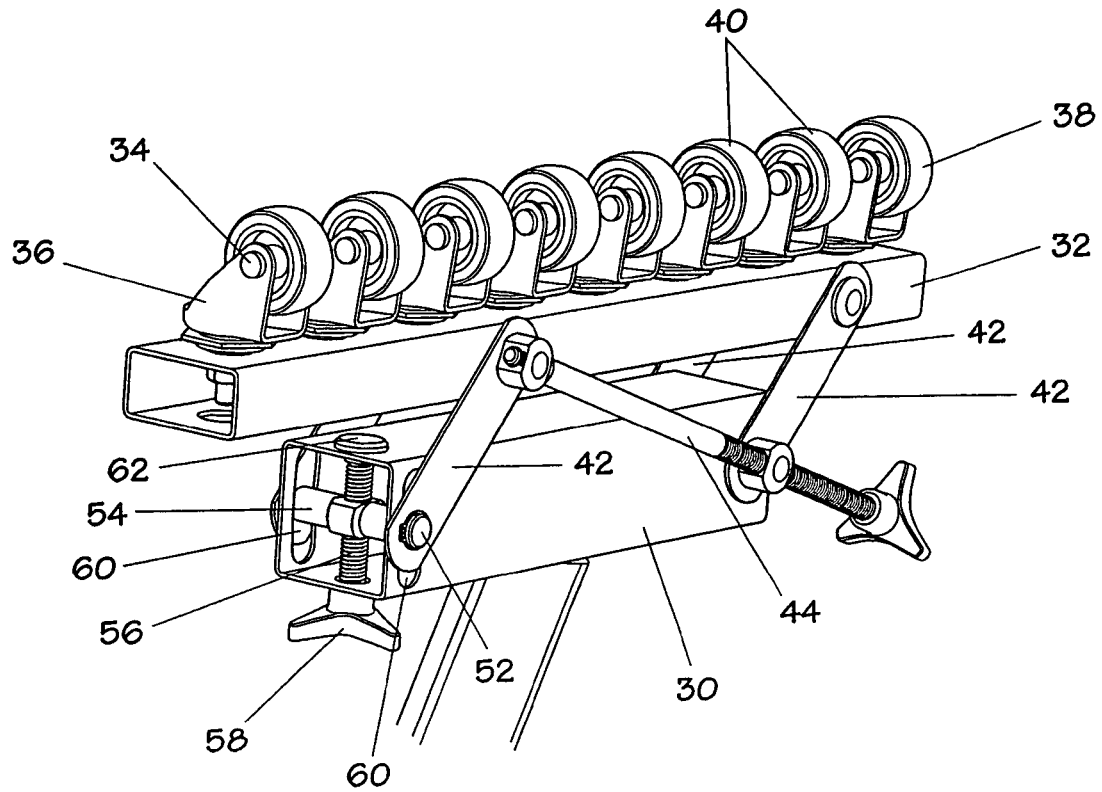
FIG. 2 is an enlarged perspective view similar to FIG. 1 showing the support head mechanism of the support shown in FIG. 1.
Figure 3:
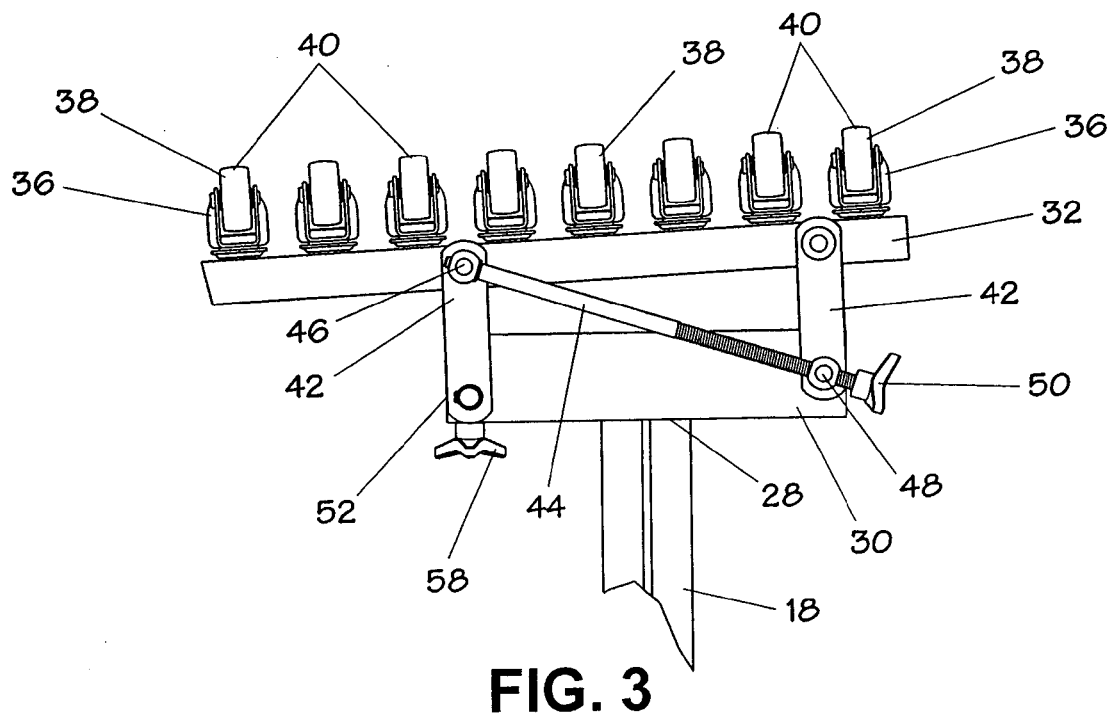
FIG. 3 is a rear view of the head portion of the support shown in FIG. 1, with the head height adjustment shown at maximum height and with the adjustable cross bar tilted to the left.
Figure 4:
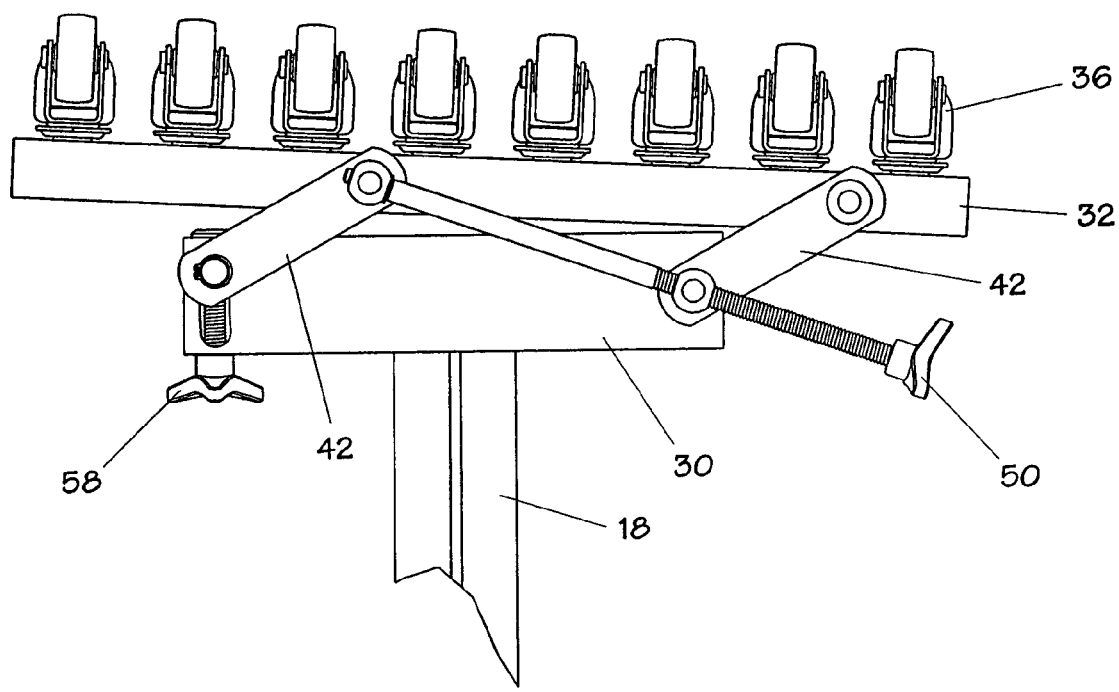
FIG. 4 is a rear view of the head portion of the support shown in FIG. 1, with the head height adjustment shown at minimum height and with the adjustable cross bar tilted to the right.
Figure 5:
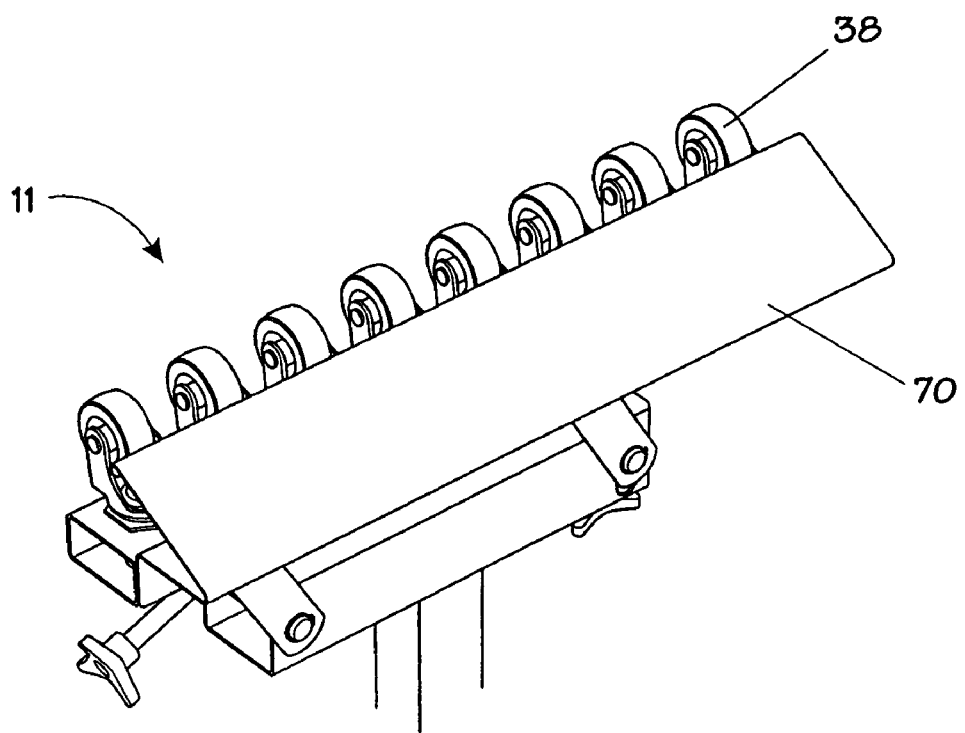
FIGS. 5 and 6 are front and rear perspective views, respectively, of the head portion a second embodiment of the support of this invention including an in-feed ramp.
Figure 6:
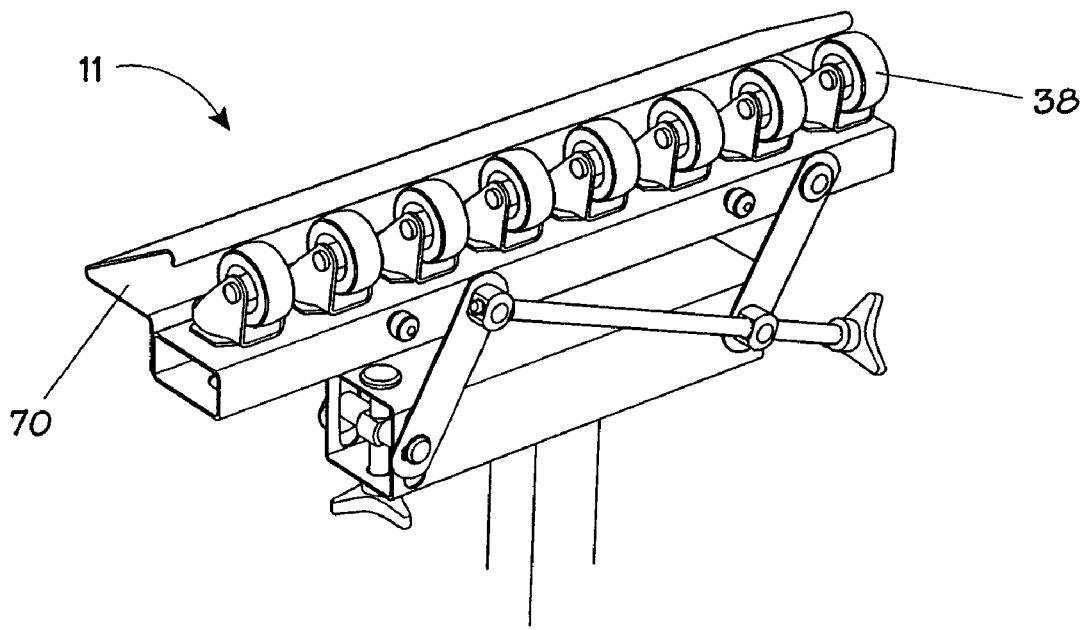
Figure 7:
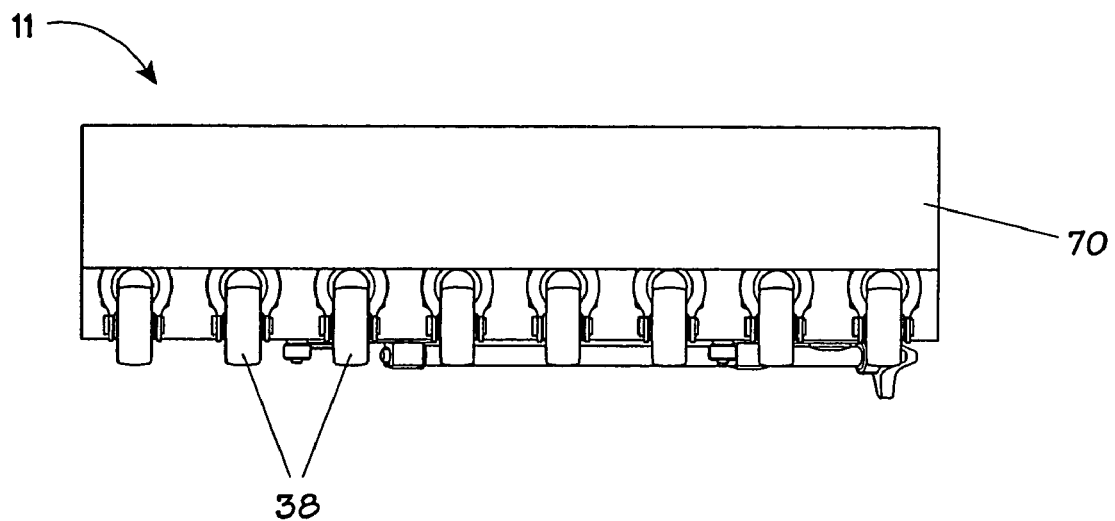
FIG. 7 is a top plan view of the embodiment of the support of this invention shown in FIGS. 5 and 6.
Figure 8:
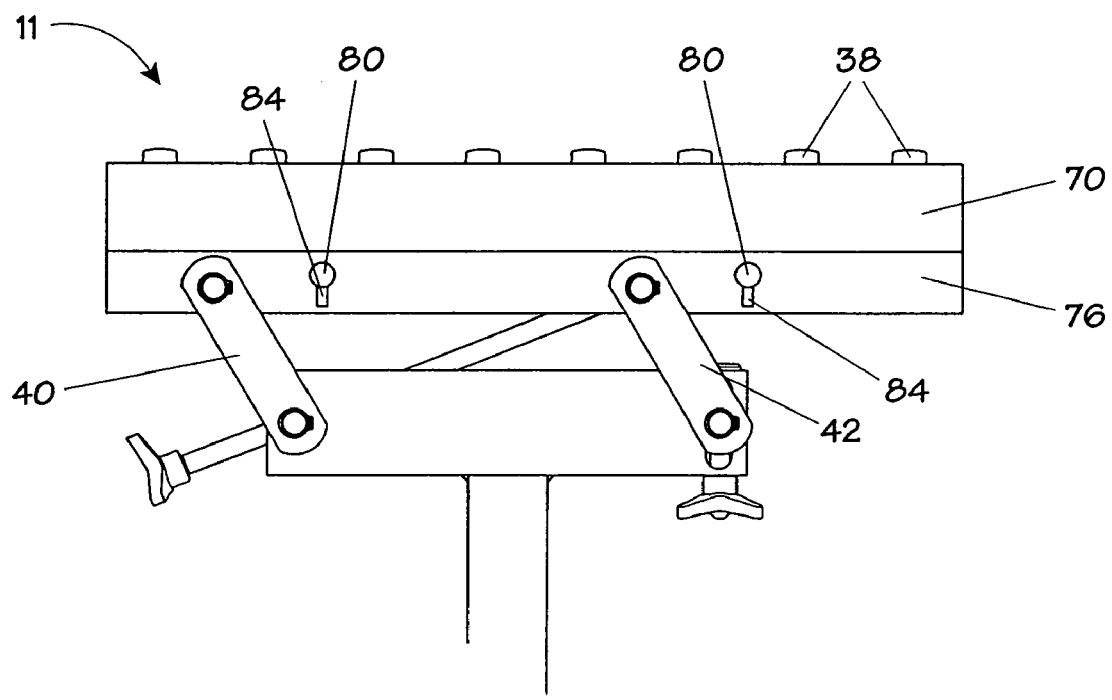
FIG. 8 is a front view of the upper portion of the support of this invention shown in FIGS. 5 and 6.

In the exemplary embodiments of the supports 10 and 11 of this invention depicted in the drawings, a base 12 (that may be made of cast iron or a variety of other materials) includes legs and feet. In the support 10 illustrated in FIG. 1, a front leg 14 and a rear leg 16 terminating in a pair of widely separated feet 17 provide a relatively heavy and very stable tripod base. The legs 14 and 16 are hinged to pivot between the open position illustrated in FIG. 1 and a closed position enabling storage of the support 10 in a relatively thin space.

The front leg 14 is a hollow tube that receives a support mast 18 that telescopes within leg 14 in order to provide substantial changes in the height above the floor of the support head 20 attached to the upper end 22 of mast 18. The cross-sectional shapes of front leg 14 and mast 18 are preferable not round so that mast 18 cannot rotate within leg 14. This can be accomplished, as shown in the illustrations, using a front leg 14 with an internal cross-sectional shape and a mast 18 external cross-sectional shape that are generally square, but other cross-sectional geometries are also possible. A thumb screw or male wing knob 24 or the like threaded into a fitting 26 near the top 19 of leg 14 can be tightened by rotating it to bear against the mast 18 and thereby lock it in a desired position within leg 14.

In the support 111 illustrated in FIGS. 10 and 11, a front leg 114 and rear leg 116 each terminate in a pair of widely separated feet 117 to provide an extremely stable base. Each leg 114 and 116 is pivotably attached to a mast support 112 to pivot between the splayed position shown in FIG. 10 and the folded, storage position show in FIG. 11.

Mast support 112 provides a sleeve 113 within which mast 18 slides to adjust the height of support 111. Mast 18 is secured in sleeve 113 by wing knob 24 or any other suitable locking or securing mechanism.

A fixed mast-head or cross-bar 30 is fixed on the upper end 28 of mast 18 by, for instance, welding the cross-bar 30 to the mast in an orientation so that cross-bar 30 will be generally parallel to the floor when mast 18 is properly positioned within leg 14. Cross-bar 30 supports an adjustable platform or cross-bar 32, on which caster wheels 36 are mounted. Caster wheels 36 are positioned so that the uppermost wheel 38 surfaces 40 are all in the same plane, regardless of the pivotal orientation of the wheel 38 axles 34.

Height of the caster wheels 36 above the floor is adjustable in two ways. First, substantial changes in height, typically needed when changing the machine with which the support 10 is used, can be made by telescoping the mast 18 within leg 14. Such adjustment is accomplished by loosening wing knob 24 to slide the mast 18 up or down and then re-tightening wing knob 24 to fix mast 18 in a new position.

Telescoping mast 18 into leg 14 also reduces the size of support 10 and the space required for its storage.

While this method of height adjustment by telescoping mast 18 within leg 14 will allow the head to be positioned approximately correctly, small adjustments in height by use of such an adjustment approach are difficult. This invention solves this problem by using telescoping only for approximate, large adjustments in height and by providing a different mechanism for small or fine adjustments in height.

Adjustable cross-bar 32 is mounted on fixed cross-bar 30 with a set of links 42 that create, together with cross-bars 30 and 23, a parallelogram structure. As will be appreciated by reference to the figures, a pair of links 42 on each of the front and back of the support head 20 allow the cross bars 30 and 32 to move toward or away from each other while maintaining the same angle relative to each other. Such positions are fixed by a threaded rod 44 and may be changed by rotation of that rod 44. Rod 44 fixed to pivot point 46 on adjustable cross-bar 32 and passes through a threaded fitting 48 pivotably attached to fixed cross bar 30. A knob 50 may be used to rotate threaded rod 44 in order to change the distance between pivot point 46 and fitting 48, thereby changing the separation between adjustable cross-bar 32 and fixed cross-bar 30.

In the support 10 of this invention, the adjustable cross-bar 32 portion of head 20 is pivoted to allow its angle to be adjusted in relation to the stand. In the illustrated embodiment, this is accomplished by attaching the lower ends 52 of one front and back pair of links 42 to an axle or link connector 54 that slides within slots 60 in fixed cross-bar 30. A threaded cross pin 56 that may be rotated by a knob 58 is threaded through link connector 54. The end 62 of threaded cross pin 56 is rotatably attached to fixed cross-bar 30. Thus, rotation of knob 58 causes link connector 54 to travel up or down within slots 60, thereby causing the angle between adjustable cross-bar 32 and fixed cross-bar 30 to change so that the plane within which wheel surfaces 40 lie can be positioned parallel to the work table of the machine with which support 10 is being used.

The support 10 of this invention uses a line of wheels to virtually eliminate discernable friction between the support and a work-piece, regardless of the weight of the work-piece. The pivoting casters 36 are mounted so that they automatically align themselves with the direction the work-piece is traveling, and because the casters 36 pivot, the work-piece cannot be guided out of alignment by the support 10, as can easily happen when a roller bar is used. Additionally, the wheels 38 provide a relatively large contact area (the sum of the wheel surfaces 40) with the work-piece.

While any desired number of caster wheels 36 can be used, eight casters 36 as shown in the figures is an appropriate number of caster wheels 36 in typical applications. Wheels 38 having a low durometer coating will further reduce the chance of damage to the work-piece. Such a coating may be a thermoplastic or a thermoset, including polyurethane and other materials.

It is often necessary or desirable to place an out-feed support at a fairly substantial distance from the machine, such as a table saw, with which it is being used. This can mean, however, that the work-piece, such as a long board, is unsupported along a significant length and sags before reaching the out-feed support. When the end of such a sagging work-piece contacts the out-feed support lower than a certain point (approximately the level of the centers of the wheels 38 in the support 10 of this invention), it can push the support 10 out of position or cause it to tall over.

The embodiments of this invention illustrated as support stands 11 and 111 in FIGS. 5-11 include a ramp 70 positioned before the caster wheels 36 to guide a work-piece up and onto the wheels 38 of caster wheels 36. The ramp 70 is angled to guide the leading edge of the work-piece up and onto the wheels 38. Such a ramp 70 may be formed of sheet stainless steel; however, a variety of other materials may be used, provided that the resulting structure provides a relatively low friction, sloping surface positioned to cause the advancing edge of a work-piece to ride up from a level somewhat below the centers of wheels 38 to a level just a little below the highest portions of wheels 38 (see FIG. 8). As will be appreciated by those familiar with various materials, a metal ramp 70 could be covered with a low friction coating or film, and ramp 70 could be made of lower friction materials than metals, such as polymeric materials.

Figure 9:
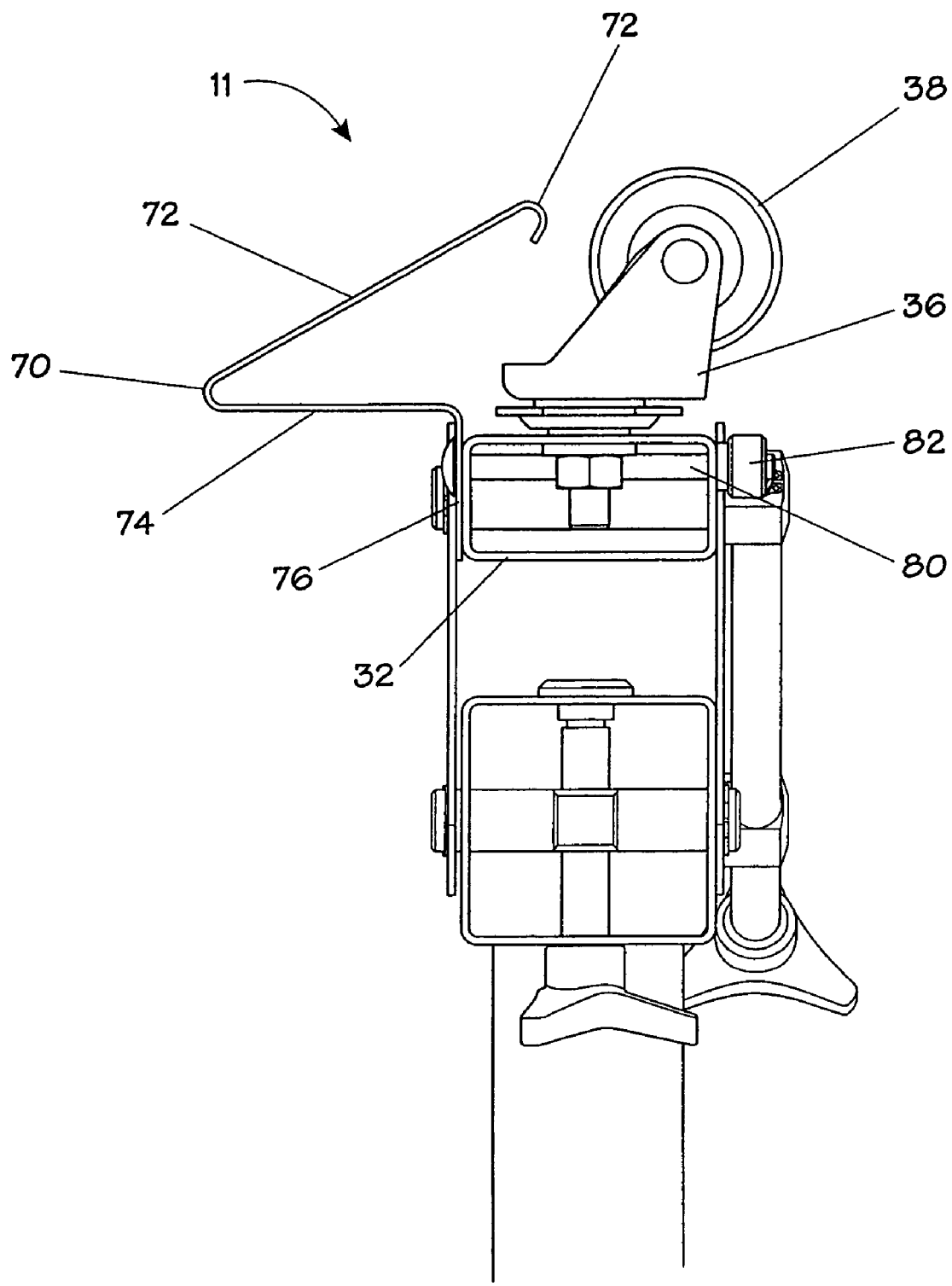
FIG. 9 is an end view of the upper portion of the support of this invention shown in FIGS. 5 and 6.

As will be appreciated by reference to FIGS. 5-11, particularly including FIG. 9, the ramp 70 can be formed of bent sheet metal having (as depicted in FIG. 9) a sloping portion 72 attached at its lower edge to a generally horizontal portion 74 that in turn attaches to a vertical flange 76 that lies against the face 78 of adjustable cross-bar 32 and under the upper ends of links 42. The upper end of sloping portion 72 can be rolled edge 73 that presents a curved surface to support the work-piece once its end moves beyond ramp 70. Ramp 70 can be attached to adjustable cross-bar 32 with bolts 80 that pass through the flange 76 and through the adjustable cross-bar 32 to be secured with nuts 82 (see FIG. 7). By positioning bolts 80 in vertical slots 84 in the flange 76 of ramp 70, the vertical position of the ramp 70 can be adjusted relative to the caster wheels 36. One of the advantages of such adjustability is that it permits ramp 70 to be positioned with its top even with (or higher than) the highest portions of wheels 38 to provide support for work-pieces too narrow to be supported adequately by the wheels 38.

In yet another embodiment of this invention, a tiltable planar support can be substituted for the fixed, height-adjustable ramp 70 described above and illustrated in FIGS. 5-9. In such an embodiment the structure for lifting the end of a sagging work-piece is a planar member or plate that is supported by arms, one or more stanchions or other structure pivotably attached to support base structure that extends away from the plate in a direction normal to the plate a distance greater than the maximum amount of expected work-piece sag before the work-piece encounters the support. The plate is initially pivoted so that it is roughly vertical and facing the advancing work-piece. When the work-piece end contacts the plate, because it does so above the pivot point, the plate tiles backward, which causes the lower portions of the plate to lift the work-piece end to the height of the plate when it reaches its horizontal position.

As will be understood by those skilled in the art, numerous configurations of supports can be practiced within the scope and spirit of this invention and the following claims in addition to the embodiments described above. Component substitutions are also possible. For instance, the ramp 70 of this invention and other components described above can be used with elongated rollers rather than the caster wheels described above and depicted in the drawings. Furthermore, all of the components of this invention can be made of a variety of materials. For instance legs 14, 16 and feet 17 can be made of a variety of materials, including steel, aluminum and other metals, plastics and other polymeric materials and composites, including, for instance, glass reinforced nylon and other polymeric materials. Legs 14, 16, 112 and 116 and feet 17 and 117 may be fabricated from tubular steel or other materials or cast in any suitable material. The other components can likewise be manufactured of a variety of different materials, including fabricated or formed steel, and cast metals, plastics and other materials, including composites. Various plastics are desirable materials for the wheels 38, although other materials such as rubber or steel could be used. The wheels also can be coated with thermoplastic or thermoset plastics, including polyurethanes and other materials. However, wheels 38 can also be manufactured of a variety of other materials such as steel or other metals, plastics and natural and synthetic rubbers. Moreover, roller balls, one or more cylindrical rollers, or low friction fixed or tilting planar support surfaces can be used in the support of this invention rather than the plurality of caster wheels 36 shown in the figures and described above.

Cross-bar or mast-head 30 and cross-bar or platform 32 are shown in the figures as sections of rectangular cross-section tube (cross-bar 30 is illustrated as rectangular tube that is square). However, other structures such as solid bars, plates, sections of U-shaped or other shapes of channel, particularly including extruded aluminum channel, or other shapes, and a variety of materials, could be used for the cross-bars 30 and 32.

Other mechanisms than those depicted in the drawings and shown above can also be used in accordance with this invention to provide a support head 20 that can be both adjusted in height through a substantial range of heights and can adjust in small, easily selected increments, the height and angle of the support wheels (or rollers, balls or other surface) relative to a machine.

Provision is necessary for adjustment of each of (1) the height above the floor on which support 10 rests, and (2) the angle relative to the floor of the plane within which the support wheels or other structures lie. For instance, adjustable cross-bar 32 could be mounted on fixed cross-bar 30 with two threaded rods rotatable in the same amount to change the height to the adjustable cross-bar 32 and rotatable in different amounts to change the angle of the adjustable cross-bar 32. The threaded rod 44 does not have to connect to pivots 46 and 48 but could alternatively be attached to other points on the links 42. In another alternative, it would be possible to drive one set of links 42 with a threaded rod running from a link 42 to the cross bar 30. Other set of links will follow due to geometry. It would also be possible to pivot cross bar 30 on mast 22 and change the angle of the head 20 by such pivoting. Finally, it would be possible to adjust the angle of the head 20 by rotating it on or with the mast, provided that the mast is not vertical.

In yet another alternative, it would also be possible to mount casters 36 on a separate cross bar pivotably attached to the upper cross bar 32 enabling the angle to be changed there rather than by changing the angle of cross bar 32.

The invention claimed is:

1. An in-feed or out-feed support for use with a machine to support a work-piece, the support comprising:
   (a) at least three rolling work-piece contact regions in a plane,
   (b) a stand supporting the work-piece contact regions and for placement on a generally horizontal support surface,
   (c) structure for adjusting the distance of the work-piece contact regions in the plane from the support surface, the structure comprising:
      (i) a first structure comprising a mast telescoping within a sleeve first structure for making substantial adjustments in the distance of the work-piece contact regions in the plane from the support surface, and
      (ii) separate, screw-actuated second structure for making small adjustments in the distance of the plane from the support surface while maintaining support for the work-piece contact regions in the plane and any work-piece resting thereon,
   (d) separate structure for adjusting the angle between the plane and the support surface transverse to the work-piece direction of travel, and
   (e) an in-feed ramp:
      (1) comprising a curved upper lip, and
      (2) repositionably attached to the stand in a plurality of positions relative to the work-piece contact regions plane.

2. The support of claim 1, wherein the in-feed ramp is made of sheet metal bent to form the curved upper lip.

3. An in-feed or out-feed support for use with a machine to support a work-piece moving in a direction of travel, the support comprising:
   (a) at least three rolling work-piece contact regions in a plane, positioned side-by-side and transverse to the work-piece direction of travel,
   (b) a stand supporting the work-piece contact regions and for placement on a generally horizontal support surface,
   (c) structure for adjusting the distance of the work-piece contact regions in the plane from the support surface, the structure comprising:
      (i) a first structure for making substantial adjustments in the distance of the work-piece contact regions in the plane from the support surface, the first structure comprising a mast telescoping within a sleeve and a mechanism for locking the mast within the sleeve, and
      (ii) separate, screw-actuated second structure for making small adjustments in the distance of the plane from the support surface while maintaining support for the work-piece contact regions in the plane and any work-piece resting thereon, and
   (d) separate structure for adjusting the angle between the plane and the support surface transverse to the work-piece direction of travel, wherein the structure for making small adjustments in the distance of the plane from the support surface comprises:
   (x) at least one pair of parallel links coupling a platform carrying the work-piece contact regions to
   (y) a lower structure attached to the stand, and
   (z) adjustment structure for changing the position of the platform relative to the lower structure attached to the stand.

4. The support of claim 3, further comprising structure for preventing the work-piece contact regions support structure from rotating relative to the stand during adjustment of the position of the plane relative to the support surface.

5. The support of claim 4, wherein the rotation-preventing structure comprises a mast that is not round positioned within a sleeve that is not round.

6. The support of claim 5, wherein the mast and the sleeve are generally square and sized to permit the mast to slide within the sleeve.

7. The support of claim 3, wherein the work-piece contact regions are mounted on a platform attached to the mast, and the sleeve is attached to support surface contact structure.

8. The support of claim 3, wherein the at least two links comprises four equal-length links, and wherein the adjustment structure comprises a rotatable threaded rod connected between an attachment point for one of the links on the platform and an attachment point for another of the links on the lower structure attached to the stand.

9. The support of claim 3, wherein the stand comprises
   four feet,
   two of which are attached to each of
   two equal-length legs pivotably attached to a sleeve within which a mast is repositionably received
      so that the legs can pivot between a splayed position for use and a closed position for storage.

10. The support of claim 3, wherein the stand comprises at least three feet, two of which feet are attached to a first leg and at least one of which feet is attached to a second leg, each of which legs is pivotably attached to a sleeve within which a mast supporting the work-piece contact regions is repositionably received so that the legs can pivot between a splayed position for use and a closed position for storage.

11. The support of claim 3, wherein the work-piece contact regions comprise caster wheels mounted on a first length of rectangular cross-section tubing, and the stand comprises a second length of rectangular cross-section tubing mounted on a mast and adjustably coupled to the first length of rectangular cross-section tubing.

12. An in-feed or out-feed support for use with a machine to support a work-piece moving in a direction of travel, the support comprising:

(a) at least three rolling work-piece contact regions in a plane, positioned side-by-side and transverse to the work-piece direction of travel, wherein the work-piece contact regions are mounted on a platform pivotably attached to the lower structure attached to the stand, and the structure for adjusting the angle between the plane and the support surface comprises a rotatable threaded rod connected between a portion of the platform and a portion of the lower structure attached to the stand, (b) a stand supporting the work-piece contact regions and for placement on a generally horizontal support surface, (c) structure for adjusting the distance of the work-piece contact regions in the plane from the support surface, the structure comprising:
   (i) a first structure for making substantial adjustments in the distance of the work-piece contact regions in the plane from the support surface, the first structure comprising a mast telescoping within a sleeve and a mechanism for locking the mast within the sleeve, and
   (ii) separate, screw-actuated second structure for making small adjustments in the distance of the plane from the support surface while maintaining support for the work-piece contact regions in the plane and any work-piece resting thereon, and (d) separate structure for adjusting the angle between the plane and the support surface transverse to the work-piece direction of travel.

13. The support of claim 12, wherein the rotatable threaded rod is connected to the platform by attachment to a first end of at least one link having two ends, the second end of which is attached to the platform so that rotation of the threaded rod changes the relative positions of the first end of the link and the lower structure.

14. The support of claim 12, further comprising an in-feed ramp attached to the structure carrying the work-piece contact regions.

15. An in-feed or out-feed support for use with a machine to support a work-piece comprising
   (a) mounted on a length of rectangular cross-section tubing:
      (i) a plurality of caster wheels positioned side-by-side and transverse to the work-piece direction of travel and
      (ii) an in-feed ramp,
   (b) four pivoting links coupling the tubing to a mast-head,
   (c) a first threaded rod coupling the tubing to the mast-head to adjust the position of the tubing relative to the mast-head by rotating the first threaded rod in order to make small adjustments in the height of the caster wheels above a support surface on which the support rests,
   (d) a second threaded rod coupling two of the links to a portion of the mast-head for changing an angular position of the tubing relative to the mast-head by rotating the second threaded rod,
   (e) a mast to which the mast-head is attached slidably mounted in a sleeve to make substantial changes in the height of the caster wheels relative to the support surface,
   (f) a screw for locking the mast in a desired position in the sleeve, and
   (g) two legs attached to the sleeve to pivot relative to each other between a splayed open position and a closed position for storage, each leg having at least one foot for contact with a floor.

\* \* \* \* \*